United States Patent
Westergaard

(10) Patent No.: US 9,352,907 B2
(45) Date of Patent: May 31, 2016

(54) WIDTH EXTENSION PART FOR MODULAR BELT

(75) Inventor: Kenneth Westergaard, Kolding (DK)

(73) Assignee: Ammeraal Beltech Modular A/S, Vejle (DK)

( * ) Notice: Subject to any disclaimer, the term of this patent is extended or adjusted under 35 U.S.C. 154(b) by 0 days.

(21) Appl. No.: 14/241,942

(22) PCT Filed: Aug. 29, 2012

(86) PCT No.: PCT/DK2012/050317
§ 371 (c)(1),
(2), (4) Date: Sep. 25, 2014

(87) PCT Pub. No.: WO2013/029624
PCT Pub. Date: Mar. 7, 2013

(65) Prior Publication Data
US 2015/0027859 A1    Jan. 29, 2015

(30) Foreign Application Priority Data

Aug. 29, 2011   (DK) ................................. 2011 70481

(51) Int. Cl.
*B65G 17/06*     (2006.01)
*B65G 17/26*     (2006.01)
(Continued)

(52) U.S. Cl.
CPC .............. *B65G 15/56* (2013.01); *B65G 17/086* (2013.01); *B65G 2207/12* (2013.01); *B65G 2207/48* (2013.01)

(58) Field of Classification Search
CPC ............................... B65G 17/06; B65G 17/26
USPC ............. 198/831, 836.4, 841, 842, 850, 851, 198/852, 853
See application file for complete search history.

(56) References Cited

U.S. PATENT DOCUMENTS 3,333,678 A * 8/1967 Rodman ........................ 198/852
4,222,483 A * 9/1980 Wootton et al. ............... 198/831
(Continued)

FOREIGN PATENT DOCUMENTS

EP     1 614 644 A1    1/2006
EP     2 275 367 A2    1/2011
(Continued)

OTHER PUBLICATIONS

International Preliminary Report on Patentability for International (PCT) Patent Application No. PCT/DK2012/050317 dated Mar. 4, 2014, 8 pages.
(Continued)

*Primary Examiner* — Douglas Hess
(74) *Attorney, Agent, or Firm* — Sheridan Ross P.C.

(57) ABSTRACT

Width adjustment device (1), for being used in connection with adjusting the width of conveyor belts of the type made up from a large number of substantially identical belt modules (2,2'), where each module along leading and trailing edges in the intended travelling direction is provided with eye parts separated by openings (17), such that an eye part on one module may be fitted in an opening (17) on an adjacent module, and where the eye parts are provided with an aperture laterally, such that when a conveyor belt is assembled from a plurality of belt modules (2,2'), a connection pin (16) may be inserted laterally through the openings in overlapping eye parts, thereby hingely connecting adjacent belt modules, where the width adjustment device (1) is detachably arranged on each belt module (2,2') along one or both sides of the conveyor belt, and where a device on one module (2) at least partly overlaps with the device arranged on the upstream and/or downstream module (2').

7 Claims, 4 Drawing Sheets

(51) Int. Cl.
 B65G 15/56 (2006.01)
 B65G 17/08 (2006.01)

(56) References Cited

U.S. PATENT DOCUMENTS

| | | | |
|---|---|---|---|
| 4,742,907 A * | 5/1988 | Palmaer | 198/831 |
| 4,944,162 A * | 7/1990 | Lang et al. | 62/380 |
| 5,280,833 A | 1/1994 | Robin | |
| 6,223,889 B1 * | 5/2001 | Layne et al. | 198/853 |
| 6,615,979 B2 * | 9/2003 | Etherington et al. | 198/851 |
| 7,228,959 B1 * | 6/2007 | Harrison | 198/852 |
| 7,234,589 B2 * | 6/2007 | Sedlacek | 198/841 |
| 7,661,524 B2 * | 2/2010 | Damkjaer | 198/853 |
| 7,841,462 B2 * | 11/2010 | Layne et al. | 198/831 |
| 8,397,903 B2 * | 3/2013 | Andersen | 198/778 |
| 8,857,607 B2 * | 10/2014 | Lasecki et al. | 198/850 |
| 2004/0011627 A1 | 1/2004 | Palmaer et al. | |

FOREIGN PATENT DOCUMENTS

| | | |
|---|---|---|
| WO | WO 9944921 | 9/1999 |
| WO | WO 2006091919 | 8/2006 |
| WO | WO 2007/140242 A2 | 12/2007 |

OTHER PUBLICATIONS

International Search Report prepared by the European Patent Office on Nov. 5, 2012, for International Application No. PCT/DK2012/050317.

* cited by examiner

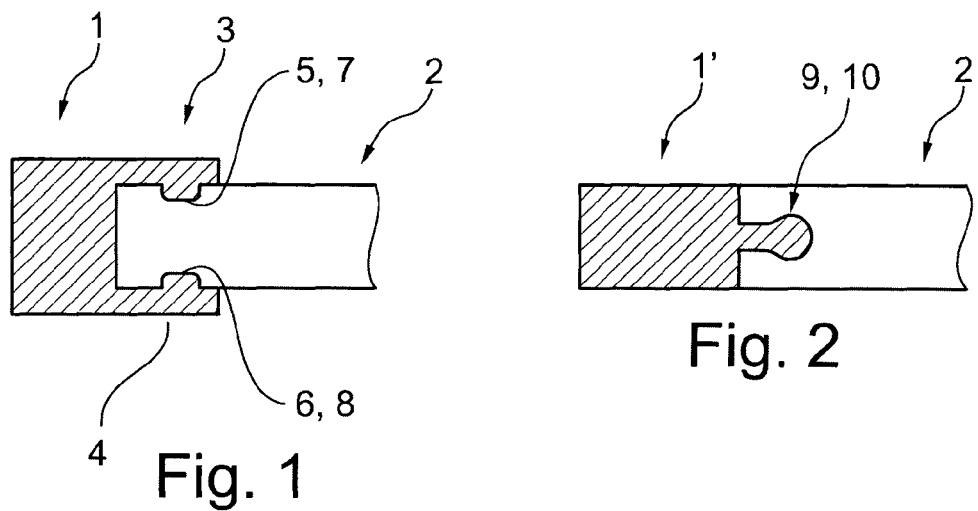
Fig. 1
Fig. 2
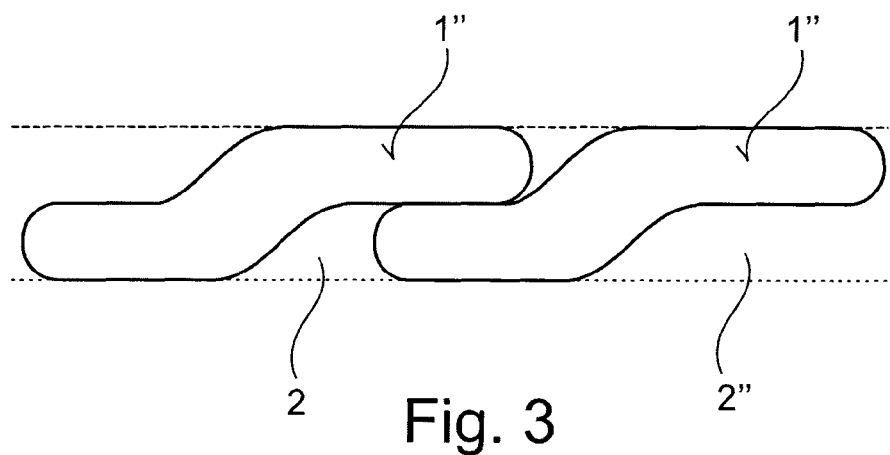
Fig. 3

WIDTH EXTENSION PART FOR MODULAR BELT

CROSS REFERENCE TO RELATED APPLICATIONS

This application is a national stage under 35 U.S.C. 371 and claims the benefit of PCT Application No. PCT/DK2012/050317 having an international filing date of Aug. 29, 2011, which designated the United States, which PCT application claimed the benefit of Danish Application No. PA 2011 70481 filed Aug. 29, 2011, the disclosure of each of which are incorporated herein by reference.

FIELD OF THE INVENTION

The present invention is directed to a width adjustment device for use in connection with adjusting the width of a conveyor belt as well as a method of using such a device in order to adjust the width of a conveyor belt.

BACKGROUND OF THE INVENTION

In the art there are many different types of conveyor belts, and the present invention is especially directed to the type of conveyor belts built up from a large number of substantially identical belt modules, typically manufactured from plastic in an injection moulding process.

The belt modules are typically connected in a hinge-like manner such that the conveyor belt may bend around sprocket wheels in either end of the conveyor which sprocket wheels conveys the propulsion power to the conveyor belt. Furthermore, the hinge connection between adjacent belt modules may be such that the belt modules may flex sideways relative to each other in order to allow the conveyor belt to travel through curves etc.

These types of conveyor belts are typically arranged on a substructure, typically made from steel or stainless steel where the path of the plastic conveyor belt is delimited by rails or flanges. The conveyor belt may also be provided with means extending below the conveyor surface which means interact with guard rails in the substructure in order to determine the path of the conveyor belt. Particularly for applications where the substructure is made for a fixed width of the conveyor belt, it is necessary to replace the conveyor when it is worn our or when other characteristics of the conveyor belt are desired by a conveyor belt of the exact same width in order to provide a stable and reliable travel of the conveyor belt.

The life expectancy of injection moulded plastic conveyor belts may be upwards of 8-10 years and as such the original manufacturer of the conveyor belt may have gone out of business or may have changed dimensions of the modules such that it is not possible to replace the modules making up the entire conveyor belt with a similar module having the possibility of providing the same width, and as such the substructure needs to be replaced as well. Typically, the life expectancy of a substructure made from stainless steel is substantially longer than 10 years in that the tear and wear on this structure relative to the plastic injected belt modules is considerably more durable.

In the art is known to mount wear parts on side faces of the modular belt links, see for example U.S. Pat. No. 5,280,833 in order to prolong the effective service life of the conveyor belt. These wear parts however are not suitable nor foreseen to adapt the modular conveyor belt to the sub-structure. On the contrary the sub-structure must be dimensioned to allow for the extra space required by these wear parts. The wear parts are typically made from wear resistant materials, such as Kevlar or carbon reinforced polymers.

OBJECT OF THE INVENTION

It is therefore an object of the present invention to provide width adjustment devices which may be added to any conveyor belt of the type made up of a plurality of substantially identical belt modules in order to adjust the width of the conveyor belt such that it will fit with the existing substructure.

DESCRIPTION OF THE INVENTION

The invention addresses this by providing a width adjustment device for use in connection with adjusting the width of conveyor belts of the type made up from a large number of substantially identical belt modules, where each module along leading and trailing edges in the intended travelling direction is provided with eye parts separated by openings, such that an eye part on one module may be fitted in an opening on an adjacent module, and where the eye parts are provided with an aperture laterally, such that when a conveyor belt is assembled from a plurality of belt modules, a connection pin may be inserted laterally through the openings in overlapping eye parts, thereby hingely connecting adjacent belt modules, where the width adjustment device is detachably arranged on each belt module along one or both sides of the conveyor belt, and where a device on one module at least partly overlaps with the device arranged on the upstream and/or downstream module.

The advantage of being able to select a width adjustment device having a width corresponding to the gap between the width of the belt and the width of the substructure provides the possibility to arrange a different type of conveyor belt on the substructure making replacement much cheaper and faster. The belt may have different characteristics such as for example the surface may be different in order to be able to carry other products or replacement may be necessary for any other reason. By furthermore assuring that the width adjustment device overlaps with a neighbouring adjacent width adjustment device, continuity in the conveyor side surface is provided and therefore even with a width modification, the width adjustment devices provides smooth running against the side limitations. The overlap also foresees that a width adjustment device is supported by an adjacent width adjustment device which all together makes the add-on width adjustment device more reliable and easy to control during operation of the conveyor belt.

In a further advantageous embodiment, the device is integral with the connection pin or a section of the connection pin, hingely connecting two adjacent belt modules.

By making the width adjustment device an integral part of the connection pin which connection pin connects adjacent modular belt links, the width adjustment device is arranged in a fixed position relative to the modular belt link, and furthermore the modular belt link does not need any modification in order to be suitable to operate together with the width adjustment device in that a wide variety of belt modules are available which are connected by means of a connection pin such that the inventive device according to the present invention may by applied to a wide variety of already existing conveyor belts. Furthermore, the integral connection with the conveyor pin provides a nice and easy manner in which to fasten the adjustment device to the conveyor belt and at the same time assure that the exact same mounting, reliably will be attached to each conveyor belt module. The overlap provided as mentioned above furthermore foresees that the width extension of the conveyor belt is provided with the same load bearing capabilities as the main part of the conveyor belt.

The width adjustment device also makes it possible to mount a standard conveyor belt from a different supplier, by adapting the width of the different conveyor belt to the existing sub-structure. This aspect often makes it possible to install cheaper conveyor belts, than the originally fitted belt.

In a still further advantageous embodiment of the invention, the device is orthogonal to the pin or a section of the pin, having a general Y-shape, having three portions extending from a central section, where the pin is integral with one of the three portions and where the distance between the distal ends of the two other portions is larger than the dimension of the portion on which the pin is fastened, and that in use the distal ends extends beyond the distal end of the adjacent adjustment device on which the pin is integrally arranged.

With this configuration the width adjustment device is substantially fixed relative to each other in that the two distal ends of the portions in which the pin is not arranged, overlaps the distal end of an adjacent device where the pin is arranged, such that the movement of the device is limited to the play i.e. surplus distance between the distal ends of the Y. This configuration still allows the belt modules to bend in the hinge created by the hinge pins in order to be bent around sprocket wheels in a normal conveyor construction.

In a still further advantageous embodiment, the lateral width of the device, relative to the intended travelling direction is between 3 and 65 mm. Typically the injection moulded belt modules will be provided in certain width increments such that the adaptation of a conveyor belt to a particular substructure, only requires the device to bridge a limited gap between the conveyor belt and the substructure. For this purpose it is envisioned to manufacture the width adjustment device according to the present invention in certain standard widths such that by selecting a standard width adjustment device for a standard belt module, it will be adapted to either another standard in the market or to an abandoned conveyor width which need a new conveyor belt as discussed above. Typically this necessitates that the maximum width of the width adjustment device is up to 65 mm which when the device is arranged along both side edges of a conveyor will provide 130 mm adjustment possibility or any increment due to selection of devices in the inventive interval between 3 and 65 mm.

In a still further advantageous embodiment, the device is manufactured from a low wear material such as carbon-reinforced plastics, nylon, Delarin®. In this embodiment the device has a dual function, both as a width adjustment device, but also as a wear part such that the combined effect provides an overall improved conveyor belt. When combined with one of the advantaged embodiments mentioned above where the width adjustment device is integral with the connection pin, the device has a triple function eye both as a connection pin between adjacent belt modules as a width adjustment device altering the width of the conveyors such they may fit unto a substructure dimensioned for a different type of standard belt and as a wear part which is especially interesting for side flexing conveyor belts which need to go through curves or in circles as is the case with spiral conveyors.

The invention is also directed to a method of adjusting the width of a conveyor utilising the inventive width adjustment devices as mentioned above in order to adapt a conveyor belt to a substructure not having a the corresponding width.

DESCRIPTION OF THE DRAWING

The invention will now be explained with reference to the accompanying drawing wherein FIGS. 1 and 2 illustrate an embodiment of the invention where the adjustment device 1 is snapped on the side edge of a modular belt link 2

FIG. 3 illustrates a side view of a conveyor belt provided with overlapping width extension devices 1" arranged on adjacent modular belt links

In FIG. 1 is illustrated an embodiment of the invention where the adjustment device 1 is snapped on the side edge of a modular belt link 2. The adjustment device 1 in this embodiment is provided with two flanges 3, 4 which are distanced such that the thickness of the modular belt link will fit in between the two flanges 3, 4 and by furthermore providing protrusions 5,6 having mirror image indentations 7, 8 in the belt link, the adjustment device 1 is effectively snapped on and fastened to the side edge of the modular belt link 2.

The further embodiment is illustrated in FIG. 2 where the width adjustment device 1' is provided with a tongue which is inserted into a groove provided in a side edge of the modular belt link 2. In this manner, the width adjustment device does not interfere with the overall thickness of the modular belt and by arranging the width adjustment device in a groove, the groove may be manufactured on standard modules either during production of the standard modules or after a production in a rework in order to adapt the side modules to the specific width by providing a groove such that the width adjustment device 1' may be fitted.

In FIG. 3 is illustrated a side view of a conveyor belt provided with overlapping width extension devices 1' arranged on adjacent modular belt links 2,2'. In this manner the side edge will be supported along the entire longitudinal direction of the side edge and as such a stable and reliable adaptation of a standard modular belt link may be provided to a different width of the substructure than what the modular belt link originally was intended for.

Figure 4:
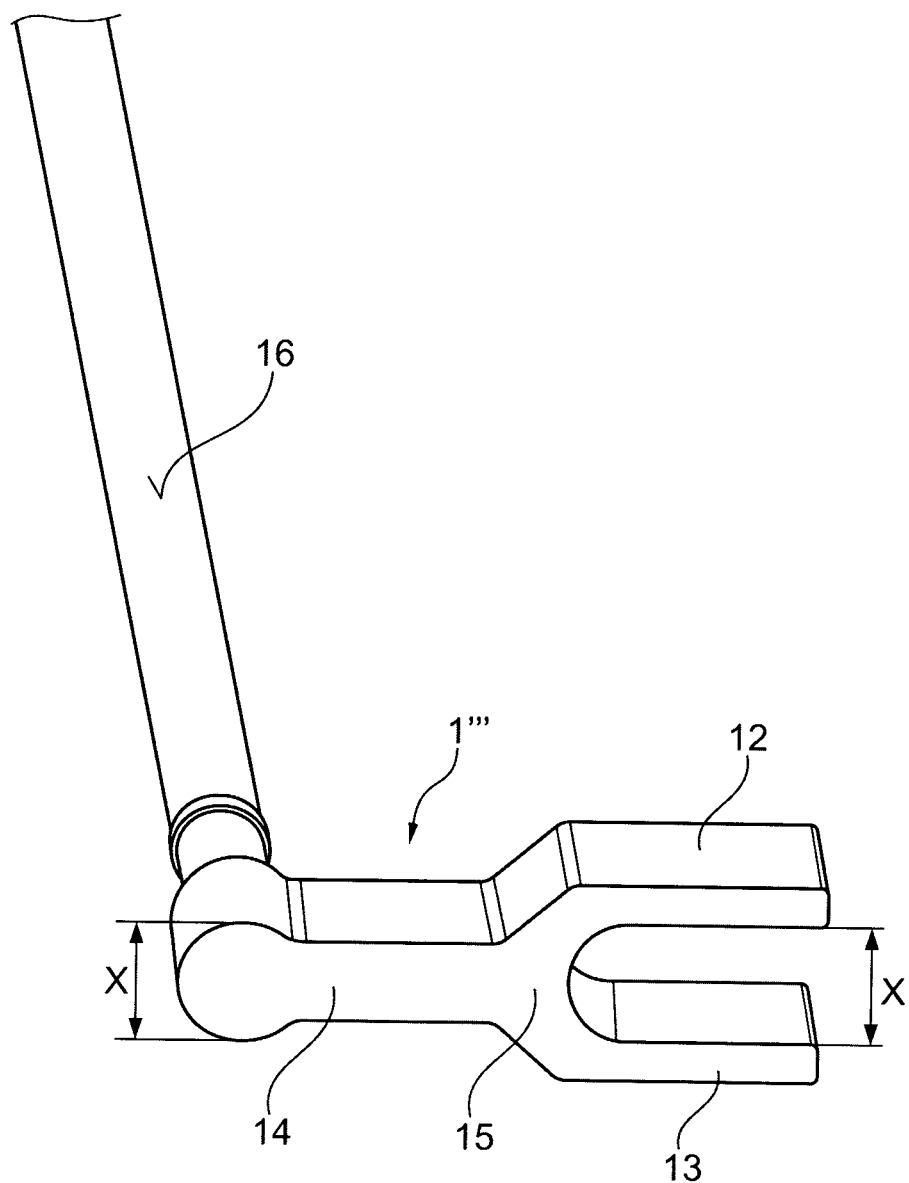
FIG. 4-6 illustrate further embodiments where the width adjustment device 1'" has a general Y-shaped configuration where three portions 12, 13, 14 extend from a central section 15.
Figure 5:
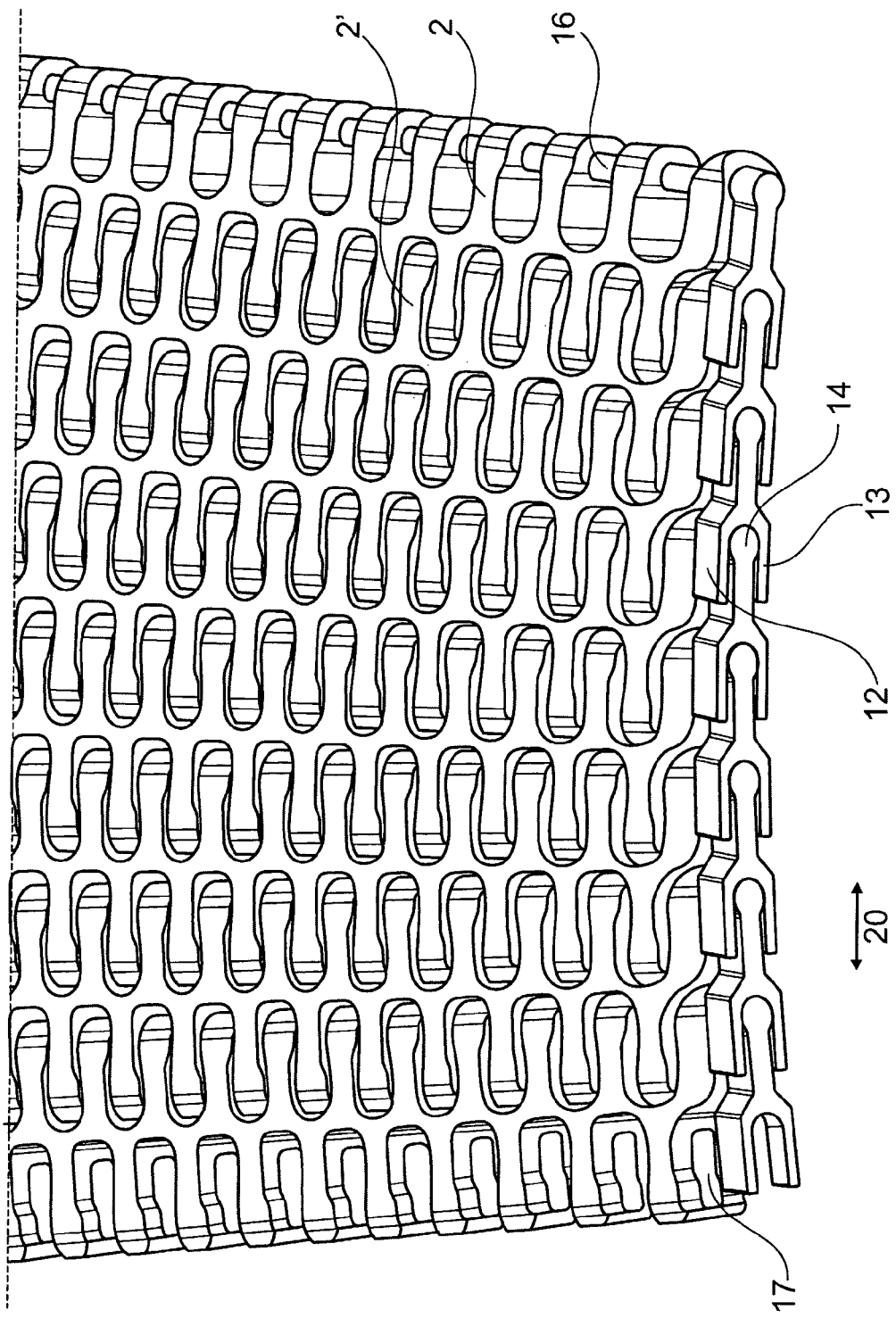
Figure 6:
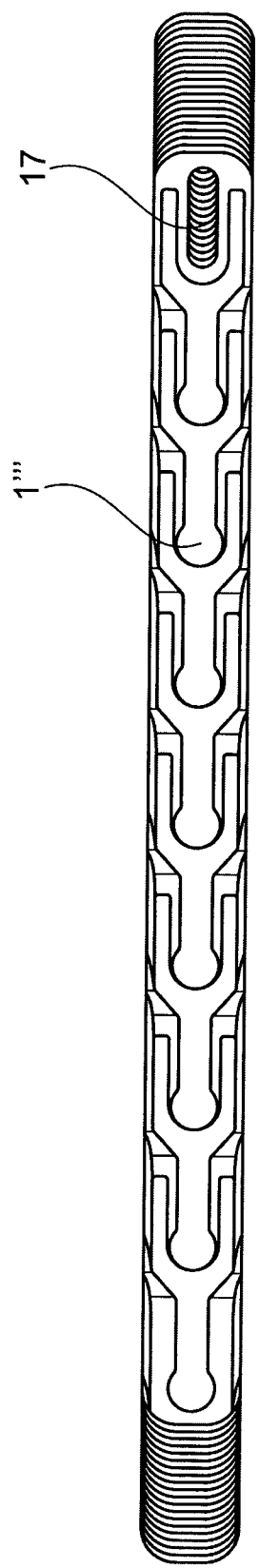

In FIGS. 4, 5 and 6 is illustrated further embodiment where the width adjustment device 1'" has a general Y-shaped configuration where three portions 12, 13, 14 extend from a central section 15. Integral with one of the portions 14 is a connection pin 16 which as illustrated in FIG. 5 is used as a connection pin between adjacent belt modules 2 and 2'. The modules 2,2' are provided with openings 17 such that by overlapping the opening 17 in one module 2 with the corresponding openings in an adjacent module 2' a through-going aperture in a direction perpendicular to the intended travel direction as indicated by the arrow 20 is provided. When two adjacent modular belt links 2,2' are positioned such that their apertures 17 are overlapping, the connection pin 16 may be laterally inserted into the overlapping openings 17 thereby hingely connecting adjacent modular belt links. This technology is widespread in the art and as such does not bring anything to the invention. The further feature of providing the connection pin integral with the width adjustment device provides that the belt modules 2, 2' do not need to be provided with special features as was the case with the embodiments of the invention explained with reference to FIG. 1 or 2, but the invention integrating the connection pin in the width adjustment device is suitable to be attached to any belt module having a lateral opening 17.

Turning back to FIG. 4, the distance X between the distal ends of the portions 12, 13 is slightly larger than the distance Y corresponding to the distal end of the third portion 14 such that as illustrated with reference to FIG. 5 the distal ends of the portions 12,13 may overlap an adjacent adjustment width device by accommodating the portion 14 between the distal ends of the portions 12,13. This provides for a very rigid and yet flexible structure which will have the same load carrying capabilities and strength characteristics as the normal conveyor belt made up from the belt modules.

In FIG. 6 is illustrated a side viewing of the conveyor illustrated in FIG. 5 which further illustrated that the extent of the belt modules is slightly larger in the thickness direction than the corresponding extent of the width adjustment device such that the width adjustment device 1''' will not interfere with the substructure apart from the side limitation of the substructure thereby breaching the gap between the conveyor belt not having the exact measurements as a substructure providing for safe and reliable travel of the conveyor belt.

The invention claimed is:

1. A width adjustment device used for adjusting the width of conveyor belts of the type having a large number of substantially identical belt modules, where each module along leading and trailing edges in the intended travelling direction is provided with eye parts separated by openings, such that an eye part on one module may be fitted in an opening on an adjacent module, and where the eye parts are provided with an aperture laterally, such that when a conveyor belt is assembled from a plurality of belt modules, a connection pin may be inserted laterally through the openings in overlapping eye parts, thereby hingedly connecting adjacent belt modules, and where the conveyor belt defines a transport plane, where the width adjustment device has a height orthogonal to the transport plane, and a length in the intended travelling direction such that a device on one module at least partly overlaps with the device arranged on the upstream and/or downstream module, and a width perpendicular to the intended travelling direction, where said device is detachably arranged on each belt module along one or both sides of the conveyor belt, and where the device has a Y-shape oriented orthogonal to the pin or a section of the pin, and two portions of the Y-shape of the device are aligned along the height orthogonal to the transport plane such that one portion resides above the other portion.

2. The width adjustment device according to claim 1 wherein the device is integral with the connection pin or a section of the connection pin, hingedly connecting two adjacent belt modules.

3. The width adjustment device according to claim 2 wherein the device has three portions extending from a central section, where the pin is integral with one of the three portions and where the distance between the distal ends of the two other portions is larger than the dimension of the portion on which the pin is fastened, and that in use the distal ends extends beyond the distal end of the adjacent adjustment device on which the pin is integrally arranged.

4. The width adjustment device according to claim 1 wherein the lateral width of the device, relative to the intended travelling direction is between 3 and 65 mm.

5. The width adjustment device according to claim 1 wherein the device is manufactured from a low wear material.

6. The width adjustment device according to claim 1 wherein the low wear material includes at least one of carbon-reinforced plastics, nylon, or Delarin®.

7. A method of adjusting the width of a conveyor belt relative to a substructure on which the conveyor belt is to travel, where the conveyor belt has a plurality of substantially identical belt modules, where each module along leading and trailing edges in the intended travelling direction is provided with eye parts separated by openings, such that an eye part on one module may be fitted in an opening on an adjacent module, and where the eye parts are provided with an aperture laterally, such that when a conveyor belt is assembled from a plurality of belt modules, a connection pin may be inserted laterally through the openings in overlapping eye parts, thereby hingedly connecting adjacent belt modules, where the width of the conveyor belt is assembled from one or more substantially identical belt modules, such that the width is less than the width of the substructure onto which the conveyor belt is intended to travel, wherein a width adjustment device is added to the conveyor belt as a retrofit solution in which the device has a height orthogonal to the transport plane, and a length in the intended travelling direction such that a device on one module at least partly overlaps with the device arranged on the upstream and/or downstream module, and a width perpendicular to the intended travelling direction, where said width adjustment device has two portions aligned along the height orthogonal to the transport plane such that one portion resides above the other portion and is selectively attached to an existing conveyor belt on each belt module along one or both side edges of the existing conveyor belt to adjust the width of the conveyor belt relative to the substructure such that the width adjustment comprises the width perpendicular to the intended travelling direction.

\* \* \* \* \*